June 24, 1930.    J. C. McCUNE    1,765,378
ANGLE COCK DEVICE
Filed Oct. 1, 1928
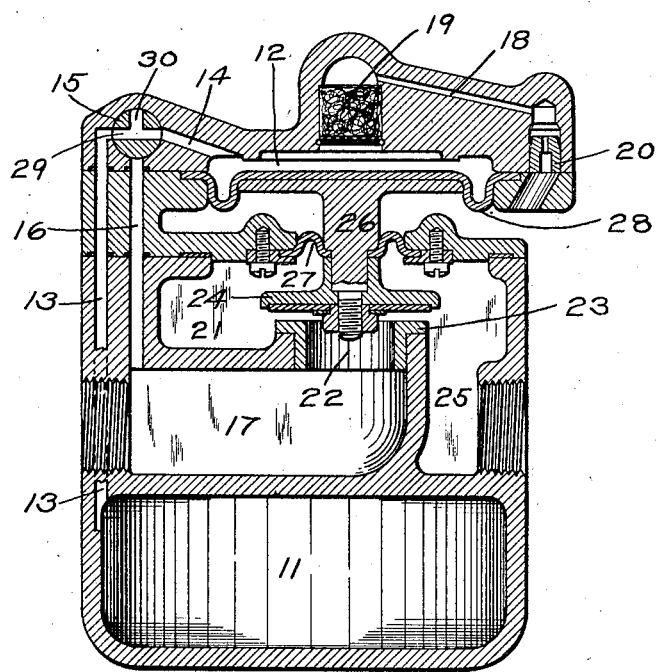
INVENTOR
JOSEPH C. McCUNE
BY *Wm. N. Cady*
ATTORNEY Patented June 24, 1930

1,765,378

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed October 1, 1928. Serial No. 309,402.

This invention relates to fluid pressure brakes and more particularly to an angle cock device.

An object of the invention is to provide an angle cock device having a diaphragm type of valve, which device is adapted to be installed at the opposite ends of a car for controlling communication through the brake pipe.

Another object of the invention is to provide a valve of the character specified having means for timing the opening thereof in order to prevent a too rapid drop in the fluid pressure in the charged section of a train. A too rapid drop of brake pipe pressure would cause an emergency rate of drop in the charged section of train and thus effect an emergency application of the brakes.

Another object of the invention is to provide a valve device of the above mentioned type which will be normally open, and which may be intentionally temporarily closed upon being manually operated.

Another object of the invention is to provide an angle cock device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic sectional view of an angle cock device embodying my invention, showing the same in the normal open position as assumed when the brake pipe of a train is open.

Referring to the drawing, the angle cock device may comprise a casing provided with a chamber 11 which is in communication with another chamber 12 by means of passages 13 and 14 controlled by a three-way plug valve or cock 15.

The cock 15 also controls the fluid flowing through a passage 16 communicating with a conduit 17 at the brake pipe end of the device.

Chamber 12 is open to the atmosphere through a passage 18 containing a strainer 19 and a choke plug 20.

A chamber 21, formed in the casing, is in communication with the conduit 17 through an opening 22 having a seat 23 for a valve 24. The chamber 21 also communicates with a conduit 25 at the hose end of the device.

The valve 24 has a stem 26 to which is fixed a pair of spaced diaphragms 27 and 28.

The diaphragm 27 is mounted in the wall of the casing and is subject to atmospheric pressure on one side and to the pressure of the brake pipe fluid in chamber 21 on the other side. The diaphragm 28 is subject, on one side, to the pressure of the fluid in chamber 12, and is subject to atmospheric pressure on the other side.

In operation, with the valve in the normal open position shown, chamber 11 is open to the atmosphere through passage 13, cock 15, passage 14, chamber 12, and passage 18. The pressure of the brake pipe fluid in chamber 21 acting on diaphragm 27 will maintain valve 24 in open position, and therefore the brake pipe section of the train will be open throughout.

At the end of a train it is necessary to use a dummy coupling in order to close the brake pipe, since the valve device at the end of the train will be in the open position.

In order to disconnect a portion of a charged train without venting fluid under pressure from the brake pipe, an operator turns the cock 15 to register the ports 29 and 30 thereof respectively with passages 16 and 13, so as to connect conduit 17 to chamber 11, thereby charging chamber 11.

When the chamber 11 is thus charged, the cock 15 is returned to the position shown and fluid from chamber 11 flows through passage 13, port 29, and passage 14, into chamber 12, from which it passes to the atmosphere through strainer 19, passage 18, and choke 20.

However, the pressure of fluid entering chamber 12 from the chamber 11 is sufficient to move the diaphragm 28, thereby forcing valve 24 on to its seat 23 against the pressure of fluid in chamber 21 on valve 24, since diaphragm 28 is larger than diaphragm 27.

When the valve 24 has been seated in the manner described, the hose between the cars may be separated and dummy couplings applied. The pressure of the fluid on diaphragm 28 gradually reduces and when reduced to a predetermined amount, the valve 24 opens, due to the pressure of the brake pipe fluid in opening 22 thereon. It is during this time period that the operator must disconnect couplings and apply dummy couplings.

In coupling, the cock 15 is operated as above described to close the valve 24. The dummy coupling is then removed and the hose couplings coupled. The fluid from chamber 11 then gradually blows away through the vent provided by passages 13 and 14, chamber 12, and passage 18, thereby reducing the pressure on diaphragm 28. When the pressure of fluid in chamber 12 has been reduced a predetermined amount, the valve 24 starts to open and gradually opens, so as to permit the rate of flow from the charged to the uncharged section of train to start at a slow rate and then gradually increase until a full opening is effected. This gradual opening of the valve 24 is for the purpose of permitting a slow rate in the drop of the fluid under pressure in the charged section so as to prevent an emergency therein.

The purpose of the strainer 19 is to prevent dirt and other foreign matter from accumulating in choke 20, which would plug up, or restrict the opening therethrough. Restricting of the choke opening would increase the charging time and plugging thereof might even prevent the opening of valve 24.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A device of the class described comprising a casing provided with a conduit, a chamber, a passage connecting the chamber and conduit, a cock controlling the passage, and means actuated by the fluid from said chamber for temporarily closing the conduit.

2. A device of the class described comprising a casing provided with a conduit through which fluid is conducted from one side of the casing to the other, a valve for controlling the passage of fluid through the conduit, a chamber, means for charging the chamber with fluid from the conduit, and means actuated when the fluid in the chamber is released for operating the valve to cause the same to close the conduit.

3. A device of the class described comprising a casing provided with a conduit, a valve for closing the conduit, means for normally retaining the valve in open position, and fluid pressure sensitive means for temporarily closing the valve.

4. A device of the class described comprising a casing provided with a conduit, a valve for closing the conduit, a pair of spaced diaphragms carried by the valve and adapted to normally retain the same in open position, a chamber, means for charging the chamber with fluid from the conduit, and means for gradually releasing the fluid in the chamber whereby the diaphragms will be actuated to seat the valve.

In testimony whereof I have hereunto set my hand, this 28th day of September, 1928.

JOSEPH C. McCUNE.